United States Patent
Christ

(10) Patent No.: US 8,435,156 B2
(45) Date of Patent: May 7, 2013

(54) KIT FOR A SERIES OF PLANETARY GEARS, PLANET CARRIER AND DRIVE

(75) Inventor: Michael Christ, Karlsdorf-Neuthard (DE)

(73) Assignee: Sew-Eurodrove GmbH & Co. KG, Bruchsal (DE)

( * ) Notice: Subject to any disclaimer, the term of this patent is extended or adjusted under 35 U.S.C. 154(b) by 1559 days.

(21) Appl. No.: 10/478,951

(22) PCT Filed: Jun. 20, 2002

(86) PCT No.: PCT/EP02/06825
§ 371 (c)(1),
(2), (4) Date: Sep. 29, 2004

(87) PCT Pub. No.: WO03/004908
PCT Pub. Date: Jan. 16, 2003

(65) Prior Publication Data
US 2005/0070396 A1  Mar. 31, 2005

(30) Foreign Application Priority Data
Jul. 6, 2001  (DE) .................................. 101 32 303

(51) Int. Cl.
*F16H 57/08*  (2006.01)
(52) U.S. Cl.
USPC ............................. 475/331; 475/168; 475/179
(58) Field of Classification Search .................. 475/331, 475/348, 168, 178, 179
See application file for complete search history.

(56) References Cited

U.S. PATENT DOCUMENTS

| | | | | |
|---|---|---|---|---|
| 5,222,922 A * | 6/1993 | Takahashi et al. | ............. | 475/178 |
| 5,322,485 A * | 6/1994 | Haga | ............................. | 475/178 |
| 5,382,203 A * | 1/1995 | Bellman et al. | ............... | 475/331 |
| 5,409,430 A | 4/1995 | Hashimoto et al. | | |
| 5,472,384 A * | 12/1995 | Haga | ............................. | 475/162 |
| 5,509,865 A | 4/1996 | Hall, III | | |
| 5,643,126 A | 7/1997 | Hotta et al. | | |
| 5,655,985 A * | 8/1997 | Herstek | .......................... | 475/179 |
| 5,658,215 A * | 8/1997 | Premiski et al. | ............. | 475/331 |
| 5,711,739 A | 1/1998 | Hashimoto et al. | | |

(Continued)

FOREIGN PATENT DOCUMENTS

| | | |
|---|---|---|
| DE | 195 31 043 | 2/1996 |
| DE | 197 11 423 | 9/1998 |
| DE | 100 49 564 | 4/2001 |
| EP | 0 738 843 | 10/1996 |

OTHER PUBLICATIONS

International Search Report, issued in corresponding International Application No. PCT/EP2002/006825.

*Primary Examiner* — Justin Holmes
(74) *Attorney, Agent, or Firm* — Kenyon & Kenyon LLP

(57) ABSTRACT

In a series of planetary transmissions, the series including a least one size, each size including at least two variants, the planetary transmission including at least one planetary-transmission stage, which contains at least one planetary-gear carrier having a web face, and planets, a sun, and a ring gear, the planetary-gear carrier including bores of a first type and bores of a second type on its web face, the bores of the first type being arranged on a first circle having a first radius with respect to the imaginary axis of the planetary-gear carrier, and the bores of the second type being arranged on a second circle having a second radius with respect to the imaginary axis of the planetary-gear carrier.

35 Claims, 6 Drawing Sheets

U.S. PATENT DOCUMENTS

| | | |
|---|---|---|
| 6,422,971 B1 | 7/2002 | Katou et al. |
| 6,561,945 B2 * | 5/2003 | Shattuck et al. .............. 475/331 |
| 6,609,993 B2 * | 8/2003 | Ohkubo et al. ............... 475/331 |
| 6,863,636 B2 * | 3/2005 | Huber et al. .................. 475/331 |
| 2004/0198543 A1 * | 10/2004 | Christ .......................... 475/163 |

* cited by examiner

KIT FOR A SERIES OF PLANETARY GEARS, PLANET CARRIER AND DRIVE

FIELD OF THE INVENTION

The present invention relates to a kit for a series of planetary transmissions, a planetary-gear carrier for a series of planetary transmissions, and a drive unit.

BACKGROUND INFORMATION

One-face or two-face designs of single-stage or multistage planetary transmissions are conventional. They include at least one planetary-gear carrier having a web face, one or more planets, at least one sun, and at least one ring gear.

Series of planetary transmissions include several sizes, which each contain several variants. For example, gearing data of the toothed parts vary within a size. The size in itself is defined by one parameter or a number of parameters. The parameters of the axis height of a shaft, such as an input or output shaft, may be conventional in this case. As an alternative, or in combination, the size may also be defined by nominal torque values or nominal power outputs. In this context, it is disadvantageous that a large variety of parts is necessary for the many variants, and that the manufacturing and storage costs are therefore high. In particular, when a large range of implementable gear ratios is necessary, not only must the gearing data be varied, but also the structural designs may have to be varied, which increases the variety of parts even further.

In the case of drive units or transmissions, the maximum transmittable torques of the specific variants may be calculated or determined. One skilled in the art may design the series in such a manner, that the gradation of the gear ratios allows the customers as many uses as possible, and that the gradation of the torques satisfies the usual market requirements.

Therefore, it is an aspect of the present invention to provide a series of planetary transmissions, which may have low manufacturing and storage costs, while having a large range of implementable gear ratios.

SUMMARY

In an example embodiment of a series of planetary transmissions, the planetary-gear carrier may include bores of a first type and bores of a second type on its web face, the bores of the first type may be arranged on a first circle having a first radius with respect to the imaginary axis of the planetary-gear carrier, and the bores of the second type may be positioned on a second circle having a second radius with respect to the imaginary axis of the planetary-gear carrier. In particular, in a first variant within one size, planet bolts may be provided in bores of the first type, and, in a second variant within the size, planet bolts may be provided in bores of the second type. In this context, the planet bolts may be positionable on different radii. Therefore, different center-to-center distances between the sun and planets may be realized in different variants. Thus, the implementable range of gear ratios may be much larger than in the case of only one center-to-center distance. Since the planetary-gear carrier is usable in different variants and the bores may be designed in a manner allowing the same bolts to be used in different variants, the variety of parts in the series may be reduced considerably, and therefore the costs as well.

In an example embodiment, the planetary-transmission stage has two faces. In the first variant within one size, planet bolts may be provided in bores of the first type and flange bolts may be provided in bores of the second type, and the flange bolts may be used to join the web face of the planetary-gear carrier and a further web face. In particular, the planetary-transmission stage may have a two-face design. In a second variant within the size, planet bolts may be provided in bores of the second type and flange bolts may be provided in bores of the first type. In this context, two-face designs may transmit a particularly high torque, and it may be possible to support the planets on both sides. The structurally quite complex construction of the two-face design may be realized in such a manner, that a considerable reduction in the variety of parts may be attainable without having to do without the two faces and their features.

In an example embodiment, the gradation of the maximum transmittable torques of several variants in sizes may be such, that, in each instance, the maximum transmittable torque of a specific variant may correspond to the maximum transmittable torque of a variant of another size. In this context, with regard to an existing variant, special customer demands, such as higher torsional stiffness at an equal, maximum transmittable torque and, in particular, the same gear ratio, may be satisfied within the series, almost without additional parts, but rather by repositioning the planets, along with bearings, onto the bolts of the other type. If occasion arises, a sleeve, which is slipped onto the thinner bolt and is to be used or removed as a function of the variant, may be provided and may be cost-effective for adapting the diameter. Therefore, with the exception of the sleeves, all of the parts, including the bearings for planets, planets, sun, ring gear, planetary-gear carriers, faces, and bolts, may be reusable.

In an example embodiment, the first radius may be greater than the second radius. In this context, when the gearing data of the planets are varied, the greatest possible outer gear-teeth diameters may also be used.

In an example embodiment, spacing sleeves may be provided, which are slipped onto the flange bolts and keep the two web faces at a distance from each other. In this context, the spacing may be realized in a particularly cost-effective manner.

In an example embodiment, bores of the first and/or second type may be eccentric. In another example embodiment, the planets, along with their associated bearings, may be seated on sleeves, which have an eccentric bore and are slipped onto the cylindrical planet bolts. In this context, the center-to-center distance from the planets to the sun, which is determined by the gearing data of the sun, the ring gear, and the planets, may automatically set in during the manufacturing, and even manufacturing tolerances are compensated for.

The first and second radii may be equal.

In at least one first variant of a first size, one refinement provides for planet bolts to be in bores of the second type and flange bolts to be in bores of the first type, and, in at least one variant of a second, smaller size, this refinement may provide for planet bolts to be in bores of the first type and flange bolts to be in bores of the second type.

In this context, in the first series, a greater torsional stiffness of parts, such as the output shaft, etc., may be realizable at the same gear ratio, than in the second series. Then, the maximum transmittable torque may be less, but the variety of parts and, therefore, the costs as well, may be, on one hand, markedly reduced, and, on the other hand, the high torsional stiffness may be rapidly and easily attainable by merely interchanging flange bolts and planet bolts in a variant present within the series. In this case, flange bolts and planet bolts have different diameters.

In an example embodiment of the present invention, a series may include several series and/or may be expanded to include additional variants. The above-mentioned aspects of the series according to an example embodiment of the present invention remain, because they also pass over into a series expanded in this manner.

In the case of the planetary-gear carrier, the planetary-gear carrier may include bores of a first type and bores of a second type on its web face, the bores of the first type being positioned on a first circle having a first radius a1 with respect to the imaginary axis of the planetary-gear carrier, and the bores of the second type being positioned on a second circle having a second radius a2 with respect to the imaginary axis of the planetary-gear carrier. In particular, the planetary-gear carrier may also be used for one-face and/or two-face planetary-transmission stages, planet bolts and flange bolts being able to be provided as a function of need and type of design. In this context, the planetary-gear carrier manufactured with the aid of primary shaping or reshaping may always be used in the same manner for different variants within a series, and consequently, the manufacturing costs and storage costs may be reduced. In addition, the planetary-gear carrier may especially be manufactured in an exceedingly simple manner, because it may not include any flange braces having complicated geometries.

In the case of the drive unit, the planetary-transmission stage may include a two-face design having two web faces, and the two web faces may be joined by flange bolts. In this context, the flange bolts may be manufactured in a rapid, simple, and cost-effective manner, and much less material may be necessary than in the case of using a planetary-gear carrier having flange braces, which may contribute to cost savings. Since only bores must be provided for the flange bolts, this may eliminate the need for the costly machining of the complicated flange-brace geometry, which may include several machining operations for surfaces and cylindrical parts. Since the flange bolts may also be used as planet bolts, and vice versa, the costs may be further reduced.

In an example embodiment, the drive unit is a servo drive unit, e.g., a low-backlash and torsionally stiff, servo drive unit. In this context, the one construction kit may be implemented by servo drive units, with a large variety, using less parts. Even special demands of customers may be fulfillable without additional parts, but by merely changing the manufacturing sequence. Special designs that may be extremely expensive and may result in long lead times may be conventionally necessary for this. In the servo drive unit of an example embodiment of the present invention, even a series, which supplements variants to include further variants having a greater torsional stiffness, the same, maximum transmittable torque, and the same gear ratio, may be implementable.

This may even be practicable without additional parts, but with just the aid of skillful dimensioning of the series on the whole, in particular the gradation of the maximum transmittable torques of the variants. In each instance, these step changes in the maximum transmittable torque are therefore determined by the smaller sizes. In particular, the flange-bolt number and flange-bolt diameter of the variants of the next largest size may be designed to be correspondingly stable, similar to the planet-bolt number and planet-bolt diameter of the variants of the smaller size.

LIST OF REFERENCE NUMERALS

| | |
|---|---|
| 1, 21, 31, 41 | planetary-gear carrier |
| 2 | flange brace |
| 3, 23, 43 | planet |
| 4, 24, 44 | bearing |
| 5, 25, 35, 45 | planet bolt |
| 6, 26, 36, 46 | bearing for power take-off |
| 8, 27, 28, 38, 48 | web face |
| 32 | bores of the first type |
| 33 | bores of the second type |
| 22, 42, 51, 52, 53, 54 | flange bolt |
| 61 | slot |
| a1, a2 | radius = distance between sun and planet axes |

Example embodiments of the present invention shall now be explained in detail with reference to the Figures.

DETAILED DESCRIPTION

Figures 1A, 1B:
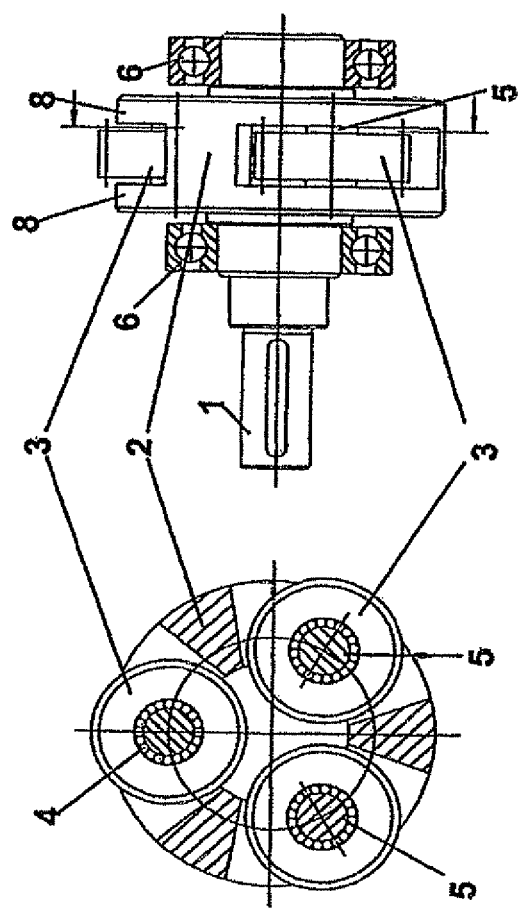
FIG. 1a is a cross-sectional view of a planetary transmission having flange braces and one type of bore for receiving planet bolts.
FIG. 1b is a schematic view of a planetary transmission having flange braces and one type of bore for receiving planet bolts.

A two-face planetary transmission according to the related art is shown in FIGS. 1a and 1b. Planetary-gear carrier 1 is manufactured, together with flange braces 2, from a fundamental form. Flange braces 2 have a large volume and therefore require a lot of material. This causes the transmission to be heavy and expensive.

Planets 3, which are seated on planet bolts 5 via bearing 4, are positioned between flange braces 2. These planet bolts 5 are inserted into bores of first web face 8 and second web face 8. The bores for planet bolts 5 are arranged on a circle, which has radius a with respect to the imaginary axis, i.e., mathematical axis of planetary-gear carrier 1.

Planetary-gear carrier 1 is supported in a housing by bearing 6.

Figure 3:
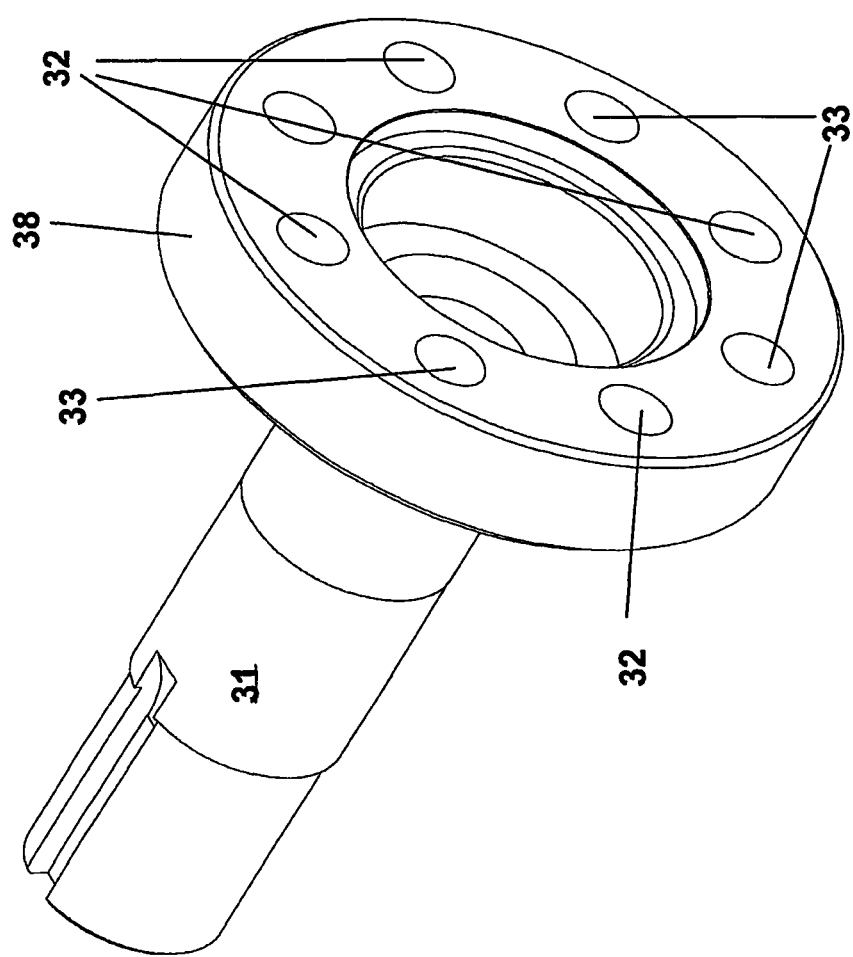
FIG. 3 is an isometric view of the planetary-gear carrier with bores.

For a first exemplary embodiment of the present invention, a planetary-gear carrier 31 for a one-face or two-face planetary transmission is shown in FIG. 3. Planetary-gear carrier 31 has a first face 38. This is provided with bores of a first type 32 and bores of a second type 33.

Bores of the first type 32 are arranged on a circle having a first radius a1 with respect to a imaginary axis. Bores of the second type 33 are arranged on a circle having a second radius a2 with respect to the imaginary axis. Second radius a2 is greater than first radius a1.

In a first variant within one size, planet bolts, which are inserted into bores of the first type 32, are provided to form an axle for each planet. In a further variant of the same size, planet bolts are provided which are inserted into bores of the second type 33. Since radius a1 of the first type of bore 32 is different from radius a2 of the second type of bore 33, the center-to-center distance of the sun and planets is different in the two mentioned variants.

In the case of the given center-to-center distance, the gear teeth of the sun, planets, and ring gear are varied within the specific size to attain various gear ratios.

In the case of the size of the series according to an example embodiment of the present invention, the range of gear ratios altogether realizable within the size through variation of the key teeth is greater with the two mentioned variants, than the range attainable by only one variant. The same planetary-gear carriers, the same planet bolts, and, in some cases, the same sun, ring gear, or planets, may be used in the two mentioned variants. This may considerably reduce the multitude of parts of the series, and therefore may reduce the manufacturing and storage costs, as well. In addition, a variant having center-to-center distance a1 or a different variant having center-to-center distance a2 may be implemented in the same housing by simply reinserting the planet bolts into bores of the other type.

Planetary-gear carrier 31 may be used in one-face and two-face constructions. They represent either a first or a second exemplary embodiment of the present invention. In this context, two-face designs may be implemented, which have flange bolts that are insertable into the other bores not occupied by planet bolts.

In further exemplary embodiments of the present invention, second radius a2 is less than first radius a1.

A third exemplary embodiment of the present invention includes a series, which contains one-face variants and further variants having two faces. Therefore, planetary-gear carrier 31 may be used repeatedly in different variants of the species.

Figures 2A, 2B:
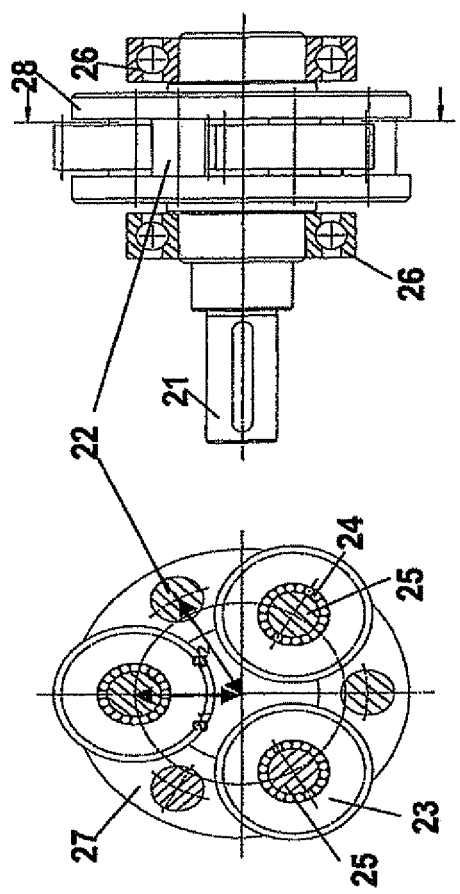
FIG. 2a is a cross-sectional view of a planetary transmission having bores of a first and second type at different radii a1 and a2.
FIG. 2b is a schematic view of a planetary transmission having bores of a first and second type at different radii a1 and a2.

A two-face design of a first variant of the exemplary embodiment according to the present invention is shown in FIGS. 2a and 2b.

Planetary-gear carrier 21 does not have any flange braces, but rather a first web face 27, which is provided with bores of a first type and a second type.

Second, separate web face 28 has a corresponding bore pattern. The first type of bore is used to receive planet bolts 25, which are provided for forming an axis for bearings 24, along with planets 23. Flange bolts 22 connect the two faces 28 and are inserted into the bores of the second type. Therefore, the planetary transmission is designed to save more material and be lighter than a planetary transmission illustrated in FIGS. 1a and 1b. The planet-bolt 25 bores shown in FIGS. 2a and 2b are arranged on a circle, which has radius a1 with respect to the imaginary axis, i.e., the mathematical axis of the planetary-gear carrier. Therefore, the center-to-center distance of the sun and planets is a1. Flange bolts 22 are arranged on a circle having radius a2.

In a further variant of the size, planet bolts 25 and flange bolts 22 are interchanged. To this end, the bores and respective bolts 22, 25 are designed to be of the same kind and, therefore, compatible. In this second variant, the center-to-center distance of the sun and planets is therefore a2. Thus, the two variants allow, on the whole, quite a wide range of gear ratios to be produced, and, in addition, the variety of parts is further reduced, and the costs are decreased. The planetary-gear carrier is supported in the housing by bearing 26.

In another exemplary embodiment according to the present invention, the bores of the first type and the bores of the second type have the same radius a1 and a2 within the same one size. However, the radii of the first and second types of bore are different. The planet bolts inserted into the bores of the first type have a smaller diameter than the flange bolts inserted into the bores of the second type. Consequently, only small bearings may be necessary for the planets. Therefore, these bearings may be inexpensive. The flange bolts are selected to be thicker, in order to ensure a rigid connection of the two faces. To produce the other variant, it may be necessary to remove the bearings for planets and slip other bearings for planets onto the flange bolts, which are now usable as planet bolts. But, since the diameter of the flange bolts is greater than the diameter of the planet bolts of the first variant, the bearings may be more expensive. However, the same planets may be usable. In addition, one may produce greater, maximum transmittable torques in this variant, the gear ratio being the same. Furthermore, this may provide being able to offer a variant having the same gear ratio and higher torsional stiffness within the same size. This may be particularly advantageous for drive units in wood-processing machines, which may often require a high torsional stiffness.

Within the series having the latter-mentioned variant of this size, there is also a possibility of satisfying special customer requests. For a variant of a smaller size of the series, the customer may desire, for example, an addition having the same gear ratio, the same, maximum transmittable torque, and a greater torsional stiffness. This may be satisfied by the described variant of the larger size. In this context, a particular characteristic of the series is that, in the case of the variant in which flange bolts are used as planet bolts, the maximum transmittable torque of the larger size may be equal to the maximum transmittable torque of a variant of the smaller size having planet bolts in the bores of the first type.

In further exemplary embodiments according to the present invention, only thin bolts, i.e., bolts having the diameter of the smallest bore within the size or series, are provided instead of thicker and thinner bolts. To produce thicker bolts, sleeves slipped onto the thin bolts may be used. Consequently, large reductions may be attainable in costs, such as storage costs and manufacturing costs, e.g., in the case of one-face designs.

Figures 4A, 4B:
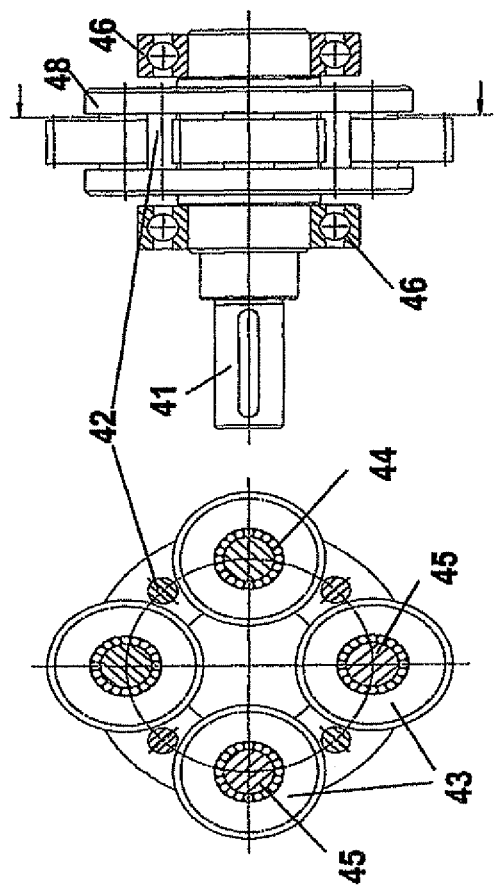
FIG. 4a is a cross-sectional view of a planetary transmission having bores of a first and second type at the same radius, and four planets.
FIG. 4b is a schematic view of a planetary transmission having bores of a first and second type at the same radius, and four planets.
Figure 5B:
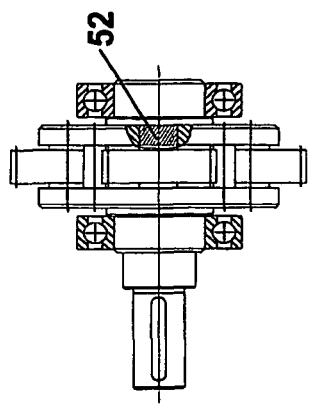
FIG. 5b is a schematic view of a planetary transmission having spur-toothed flange bolts.
Figure 5C:
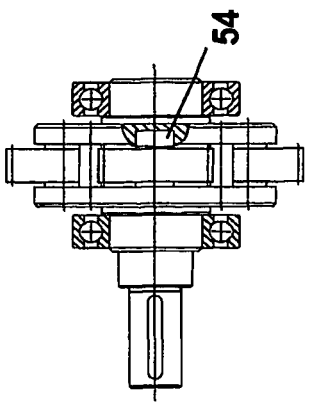
FIG. 5c is a schematic view of a planetary transmission having oblique-knurl-toothed flange bolts.
Figure 5D:
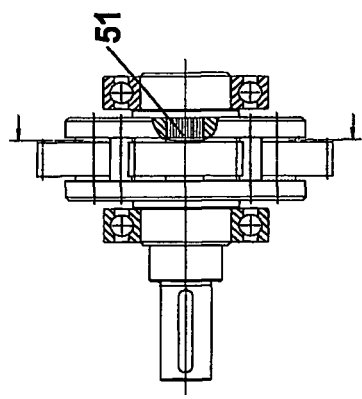
FIG. 5d is a schematic view of a planetary transmission having cross-knurl-toothed flange bolts.
Figure 5E:
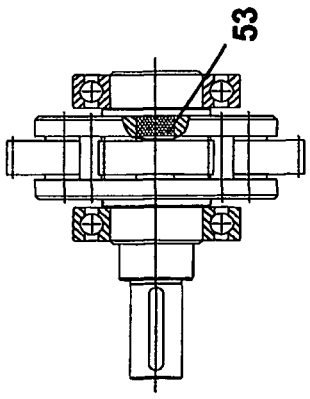
FIG. 5e is a schematic view of a planetary transmission having press-fitted flange bolts.
Figure 5A:
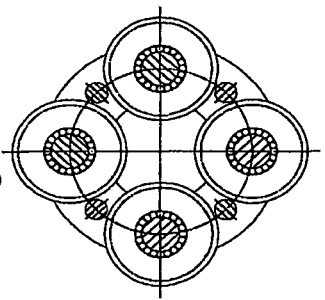
FIG. 5a is a schematic view of a planetary transmission having bores of a first and second type at the same radius, and four planets.

Shown in FIGS. 4a, 4b, and 5a are exemplary embodiments according to the present invention, which have four planets and flange bolts instead of three.

FIGS. 5b through 5e show different exemplary embodiments of the present invention.

FIG. 5b clearly shows the type of connection between flange bolts 51 and the additional face. In this context, at least the face-side end of the flange bolt is spur-cut and is pressed into the web face during manufacture.

In FIG. 5c, the wall-side end of flange bolt 52 is provided with a diagonal knurl, and, during manufacture, the flange bolt is pressed in while simultaneously being rotated.

In FIG. 5d, flange bolt 53 is provided with a cross knurl and is pressed in a corresponding manner.

Therefore, FIGS. 5b through 5d represent a form-locked connection, which has a high load-carrying capacity.

In FIG. 5e, the additional web face has a blind hole, to which cylindrical flange bolt 54 is joined by a press-fit connection.

In other exemplary embodiments according to the present invention, other connections are also usable, such as conical flange bolts having a correspondingly shaped recess in the web face. Flange bolts having a longitudinal knurl may be usable. Further connections include screw connections, bonded connections, combinations of the above-mentioned connections, etc.

In further exemplary embodiments according to the present invention, flange bolts and/or planet bolts and the web face are made from one cast, i.e., one fundamental form.

In further exemplary embodiments of the present invention, spacer sleeves are slipped onto flange bolts (22, 42), eccentric sleeves also being usable.

In further exemplary embodiments of the present invention, the bearings of the planets are slipped onto eccentric sleeves, which are slipped onto planet bolts. Therefore, the center-to-center distance of the planets and the sun may automatically set in during assembly, and manufacturing errors may be effectively compensated for.

Figure 6:
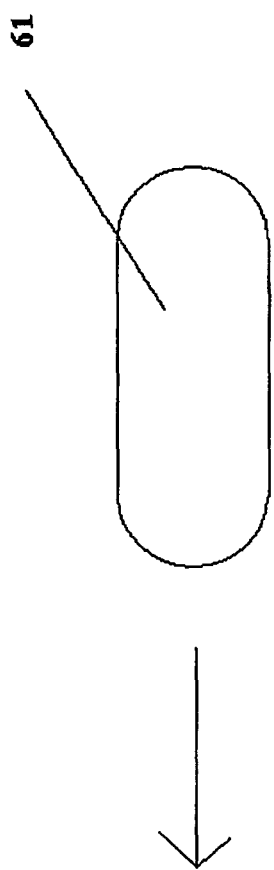
FIG. 6 is a schematic view of a slot for receiving planet bolts.

In further exemplary embodiments of the present invention, the bores in the web faces are in the form of a slot 61, which is oriented in the radial direction towards the axis of the sun. One of slots 61 is schematically shown in FIG. 6. The orientation direction is indicated by an arrow. Instead of circular bores, the slot is used to receive planet bolts. The planet bolts are cylindrical. During the manufacturing, the planet bolts are inserted into the slots, and, in this manner, the center-to-center distance determined by the gearing data of the planets, the sun, and the ring gear sets in. Tolerances of the parts may automatically be compensated for.

An example embodiment of the present invention includes series, which include combinations of one or more of the described sizes variants. Furthermore, an example embodiment of the present invention includes series, which not only include the described variants but also other transmission stages.

In further exemplary embodiments of the present invention, radius a1 of the first type of bore and radius a2 of the second type of bore are equal, and the number of all bore holes on the web face of the planetary-gear carrier has two or more prime factors. For example, this number may be 12=4×3. Therefore, with the aid of the same planetary-gear carrier, either one planetary-transmission stage having three planet bolts and three flange bolts may be realized, or one planetary-transmission stage having four planet bolts and four to eight flange bolts may be realized. In particular, the angular distance between the planet bolts and/or flange bolts may be made uniform, i.e., in the case of three planet bolts, the planet bolts may be positioned at an angle of 120° to each other, or, in the case of four planet bolts, the planet bolts may be positioned at an angle of 90° to each other. Other planetary-gear carriers, which may be usable in multiple manners, may also be manufactured as a function of the positioning and dimensioning of the bores.

In other exemplary embodiments of the present invention, radius a1 of the first type of bore is different from radius a2 of the second type of bore. In this case, other planetary-gear carriers, which may be used in multiple manners, may also be manufactured, as a function of the positioning and dimensioning of the bores, for planetary-transmission stages having different numbers of planet bolts and/or flange bolts.

In another exemplary embodiment of the present invention, the kit for the series includes a planetary-gear carrier, in whose bores of the first or second type the planet bolts are pressed, i.e., connected by press-fitting. In particular, the flange bolts may be superfluous, when the planet bolts are properly dimensioned, manufactured, and connected.

In further exemplary embodiments of the present invention, the above-mentioned bores for the flange bolts may be omitted, which means that costs may be reduced. In one size, however, the kit includes, as explained in detail above, a first planetary-gear carrier having only bores of the first type and a further planetary-gear carrier having only bores of the second type. Therefore, the kit then includes planetary-gear carriers, which are only provided for connection to planet bolts, in particular by pressing them in, but, depending on the variant, a correspondingly different center-to-center distance a1 or a2 is implementable with the planet bolts.

In addition, the omission of flange bolts may result in a space advantage, whereby, three or even more gear ratios may be realized in each of the mentioned variants, since the gearing data are correspondingly modifiable. This is also an aspect of the entire series.

In a further example embodiment, the kit also includes the above-mentioned planetary-gear carriers having two types of bores. Thus, an even greater possibility for variation may be available without having to increase the number of parts.

In other exemplary embodiments of the present invention, not only two bore patterns, i.e., the two types of bores mentioned, are provided in web face (27, 38), but at least three bore patterns. The first of these bore patterns is occupiable by planet bolts, and the remaining ones are occupiable by flange bolts or may also remain at least partially unoccupied as a function of the required mechanical strength. This may allow high stiffness and mechanical strength to be achieved. Furthermore, planet bolts may be inserted into either the second, third, or additional bore pattern. In this manner, a large number of variants may be manufactured without considerably increasing the number of parts, whereby an enormous mechanical strength may be attainable.

In further exemplary embodiments of the present invention, the board pattern includes 4 or 5 bores for the planet bolts. In the case of large transmission designs, e.g., industrial transmission designs, six or more bores for planet bolts may be provided. A greater torque may be transmitted as the number of planets increases. In addition, a greater number of bores per bore pattern may allow, on the whole, more variants to be produced without additional components.

What is claimed is:

1. A kit for a series of planetary transmissions, the series including at least two variants, each variant having different gear ratios from other variants, the kit for a series of planetary transmissions including at least one planetary transmission stage, comprising:

at least one planetary-gear carrier including a web face, on the web face, the planetary-gear carrier including first bores and second bores, the first bores arranged on a first circle having a first radius with respect to an axis of the planetary-gear carrier, the second bores arranged on a second circle having a second radius with respect to the axis of the planetary-gear carrier;

planet bolts selectively arrangeable in one of (a) the first bores and (b) the second bores;

a sun; and a ring gear;

wherein the planet bolts are arranged in the first bores in a first variant and are arranged in the second bores in a second variant.

2. The kit according to claim 1, wherein the series includes the first variant having the planet bolts arranged in the first bores, the second variant having the planet bolts arranged in the second bores, and at least one third variant having the planet bolts arranged in third bores, a maximum transmittable torque of the second variant equal to a maximum transmittable torque of the third variant.

3. The kit according to claim 1, wherein in a gradation of maximum transmittable torque of several variants, a maximum transmittable torque of one variant corresponds to a maximum transmittable torque of another variant.

4. The kit according to claim 1, wherein the first radius is greater than or less than the second radius.

5. The kit according to claim 1, further comprising:
flange bolts; and
spacer sleeves arranged on the flange bolts and configured to keep the web face and a further web face at a distance.

6. The kit according to claim 1, wherein at least one of the first bores and the second bores are eccentric.

7. The kit according to claim 1, further comprising:
planets;
bearings; and
sleeves having an eccentric bore;
wherein the planets and the bearings are seated on the sleeves, the sleeves slipped onto the planet bolts.

8. The kit according to claim 1, further comprising sleeves configured to be slipped onto thinner bolts, the sleeves one of (a) usable and (b) removable to adjust a diameter in accordance with a variant to provide other variants, the thinner bolts having a diameter equal to a smaller diameter of the first bores and the second bores.

9. The kit according to claim 1, further comprising sleeves configured to be slipped onto thinner bolts, the sleeves one of (a) usable and (b) removable to adjust a diameter in accordance with a variant to provide other variants using same components, the thinner bolts having a diameter equal to a smaller diameter of the first bores and the second bores.

10. The kit according to claim 1, wherein the planet bolts are connectable to the planetary-gear carrier by press-fit into one of (a) the first bores and (b) the second bores.

11. The kit according to claim 1, wherein the first bores and the second bores include at least one common bore.

12. The kit according to claim 1, wherein the axis is a central axis of the planetary-gear carrier.

13. The kit according to claim 1, wherein, in the first variant, the planet bolts are arranged in the first bores and in the second variant, the planet bolts are arranged in the second bores, the second variant and first variant creatable from each other by movement of the planet bolts between the first bores and the second bores.

14. The kit according to claim 1, wherein the planetary-transmission stage is arranged in a two-face arrangement, and, in the first variant, the planet bolts are arranged in the first bores and flange bolts are arranged in the second bores, the flange bolts configured to join the web face of the planetary-gear carrier and a further web face.

15. The kit according to claim 14, wherein in the second variant, the planet bolts are arranged in the second bores and the flange bolts are arranged in the first bores.

16. The kit according to claim 1, wherein the first radius and the second radius are equal.

17. The kit according to claim 16, wherein the first bores and the second bores have different bore diameters.

18. The kit according to claim 16, wherein the flange bolts and the planet bolts have one of the same diameter and different diameters corresponding to bore diameters, the kit further comprising sleeves configured to produce greater diameters and configured to be slipped onto one of the flange bolts and the planet bolts.

19. The kit according to claim 16, further comprising:
flange bolts;
wherein in the first variant, the planet bolts are arranged in the second bores and the flange bolts are arranged in the first bores, and in the second variant, the planet bolts are arranged in the first bores and the flange bolts are arranged in the second bores, to provide a greater torsional stiffness and a greater transmittable torque.

20. The kit according to claim 16, further comprising:
flange bolts;
wherein in the first variant, the planet bolts are arranged in the second bores and the flange bolts are arranged in the first bores, and in the second variant, the planet bolts are arranged in the first bores and the flange bolts are arranged in the second bores, to provide a greater torsional stiffness and a greater maximum transmittable torque.

21. The kit according to claim 1, wherein the web face of the planetary gear carrier includes at least one third bore.

22. The kit according to claim 21, wherein the at least one third bore includes at least one of different diameters and different radii.

23. A system, comprising:
a plurality of series of planetary transmissions, each series including at least two variants, each variant having different gear ratios from other variants, the plurality of series of planetary transmissions including at least one planetary transmission stage, each series including a corresponding kit including:
planets;
a sun;
a ring gear; and
at least one planetary-gear carrier including a web face, on the web face, the planetary-gear carrier including first bores and second bores, the first bores arranged on a first circle having a first radius with respect to an axis of the planetary-gear carrier, the second bores arranged on a second circle having a second radius with respect to the axis of the planetary-gear carrier;
wherein planet bolts are selectively arrangeable in one of (a) the first bores and (b) the second bores;
wherein the planet bolts are arranged in the first bores in a first variant and are arranged in the second bores in a second variant.

24. The system according to claim 23, wherein the axis is a central axis of the planetary-gear carrier.

25. A planetary-gear carrier for a series of transmission, comprising:
a web face including first bores and second bores, the first bores arranged on a first circle having a first radius with respect to an axis of the planetary-gear carrier, the second bores arranged on a second circle having a second radius with respect to the axis of the planetary-gear carrier, the first bores and the second bores configured to selectively receive planet bolts of the planetary transmission.

26. The planetary-gear carrier according to claim 25, wherein the planet bolts are arranged in one of the first bores and the second bores in a one-face planetary-transmission stage.

27. The planetary-gear carrier according to claim 25, wherein the web face includes at least one of the first bores and the second bores configured to receive the planet bolts and arranged as slots oriented in a radial direction toward the axis of the planetary-gear carrier.

28. The planetary-gear carrier according to claim 25, wherein the planet bolts are connected to the planetary-gear carrier by press-fit into one of the first bores and the second bores.

29. The planetary-gear carrier according to claim 25, wherein the axis is a central axis of the planetary-gear carrier.

30. The planetary-gear carrier according to claim 25, wherein the planetary gear carrier is configured for use in at least one of a one-face planetary-transmission stage and a two-face planetary-transmission stage.

31. The planetary-gear carrier according to claim 30, further comprising:
 a further web face, wherein the planet bolts are arranged in a first one of the first bores and the second bores; and
 flange bolts arranged in a second one of the first bores and the second bores configured to join the web face and the further web face.

32. A series of planetary transmissions, including at least two variants, each variant having different gear ratios from other variants, the series of planetary transmissions including at least one planetary transmission stage, each variant of the series including a corresponding kit including:
 planets;
 a sun;
 a ring gear; and
 at least one planetary-gear carrier including a web face, on the web face, the planetary-gear carrier including first bores and second bores, the first bores arranged on a first circle having a first radius with respect to an axis of the planetary-gear carrier, the second bores arranged on a second circle having a second radius with respect to the axis of the planetary-gear carrier;
 wherein planet bolts are selectively arrangeable in one of (a) the first bores and (b) the second bores;
 wherein the planet bolts are arranged in the first bores in a first variant and are arranged in the second bores in a second variant.

33. The series according to claim 32, wherein the axis is a central axis of the planetary-gear carrier.

34. A kit for a series of planetary gears, the series including at least two variants, each variant having different gear ratios from other variants, the kit for the series of planetary gears including at least one planetary gear stage, comprising:
 at least one planetary-gear carrier including at least one of (a) a web face and (b) two web faces including first bores and second bores, the first bores arranged on a first circle having a first radius with respect to an axis of the planetary-gear carrier, the second bores arranged on a second circle having a second radius with respect to the axis of the planetary-gear carrier;
 planets;
 a sun; and
 a ring gear;
 wherein, in a first variant, planet bolts are arranged in the first bores and in a second variant, the planet bolts are arranged in the second bores, the second variant and first variant creatable from each other by movement of the planet bolts between the first bores and the second bores.

35. The kit according to claim 34, wherein the axis is a central axis of the planetary-gear carrier.

* * * * *